US008054831B2

(12) United States Patent
Choi

(10) Patent No.: US 8,054,831 B2
(45) Date of Patent: Nov. 8, 2011

(54) METHOD AND APPARATUS FOR TRANSMITTING AND RECEIVING INFORMATION REGARDING UPNP EVENT

(75) Inventor: Cheol-won Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 369 days.

(21) Appl. No.: 11/594,748

(22) Filed: Nov. 9, 2006

(65) Prior Publication Data

US 2007/0104193 A1 May 10, 2007

(30) Foreign Application Priority Data

Nov. 9, 2005 (KR) .................. 10-2005-0107000

(51) Int. Cl.
*H04L 12/28* (2006.01)
*H04L 12/56* (2006.01)
*G06F 15/173* (2006.01)

(52) U.S. Cl. ......... 370/389; 370/392; 709/223; 709/224
(58) Field of Classification Search .......... 370/389, 370/392; 709/223, 224
See application file for complete search history.

(56) References Cited

U.S. PATENT DOCUMENTS

| 6,725,281 B1 | 4/2004 | Zintel et al. |
| 7,289,795 B2* | 10/2007 | Ma et al. .................. 455/414.1 |
| 2002/0083143 A1 | 6/2002 | Cheng |
| 2002/0112058 A1 | 8/2002 | Weisman et al. |
| 2003/0135382 A1* | 7/2003 | Marejka et al. .................. 705/1 |
| 2004/0111494 A1* | 6/2004 | Kostic et al. .................. 709/220 |
| 2004/0225689 A1* | 11/2004 | Dettinger et al. .................. 707/200 |
| 2005/0081107 A1* | 4/2005 | DeWitt et al. .................. 714/38 |
| 2005/0193395 A1 | 9/2005 | Peipelman et al. |
| 2006/0236265 A1* | 10/2006 | Bowers .................. 715/809 |
| 2010/0077310 A1 | 3/2010 | Karachale et al. |

FOREIGN PATENT DOCUMENTS

| JP | 2005-129067 A | 5/2005 |
| KR | 10-2004-0005464 A | 1/2004 |
| KR | 10-2005-0050317 A | 5/2005 |
| WO | 2004073227 A1 | 8/2004 |
| WO | WO 2004073227 A1 * | 8/2004 |

OTHER PUBLICATIONS

Bodlaender, WO 2004073227 A1.*
Offce Action dated Jun. 21, 2011, issued by the Japanese Patent Office in counterpart Japanese Application No. 2006303248.
Office Action dated Jun. 2, 2011, issued by the State Intellectual Property Office of P.R. China in counterpart Chinese Application No. 200610147006.7.

* cited by examiner

*Primary Examiner* — Marsha D Banks Harold
*Assistant Examiner* — Saad Hassan
(74) *Attorney, Agent, or Firm* — Sughrue Mion, PLLC

(57) ABSTRACT

Provided are a method and apparatus for efficiently transmitting and receiving information regarding a Universal Plug and Play (UPnP) event. In the method of receiving event information, a notice regarding a part of a plurality of status changes of a service is requested for an event indicating at least one of the status changes of the service, and information regarding the part of the status changes is received in response to the request. Accordingly, a control point can receive an event message that contains only necessary status parameters.

20 Claims, 11 Drawing Sheets

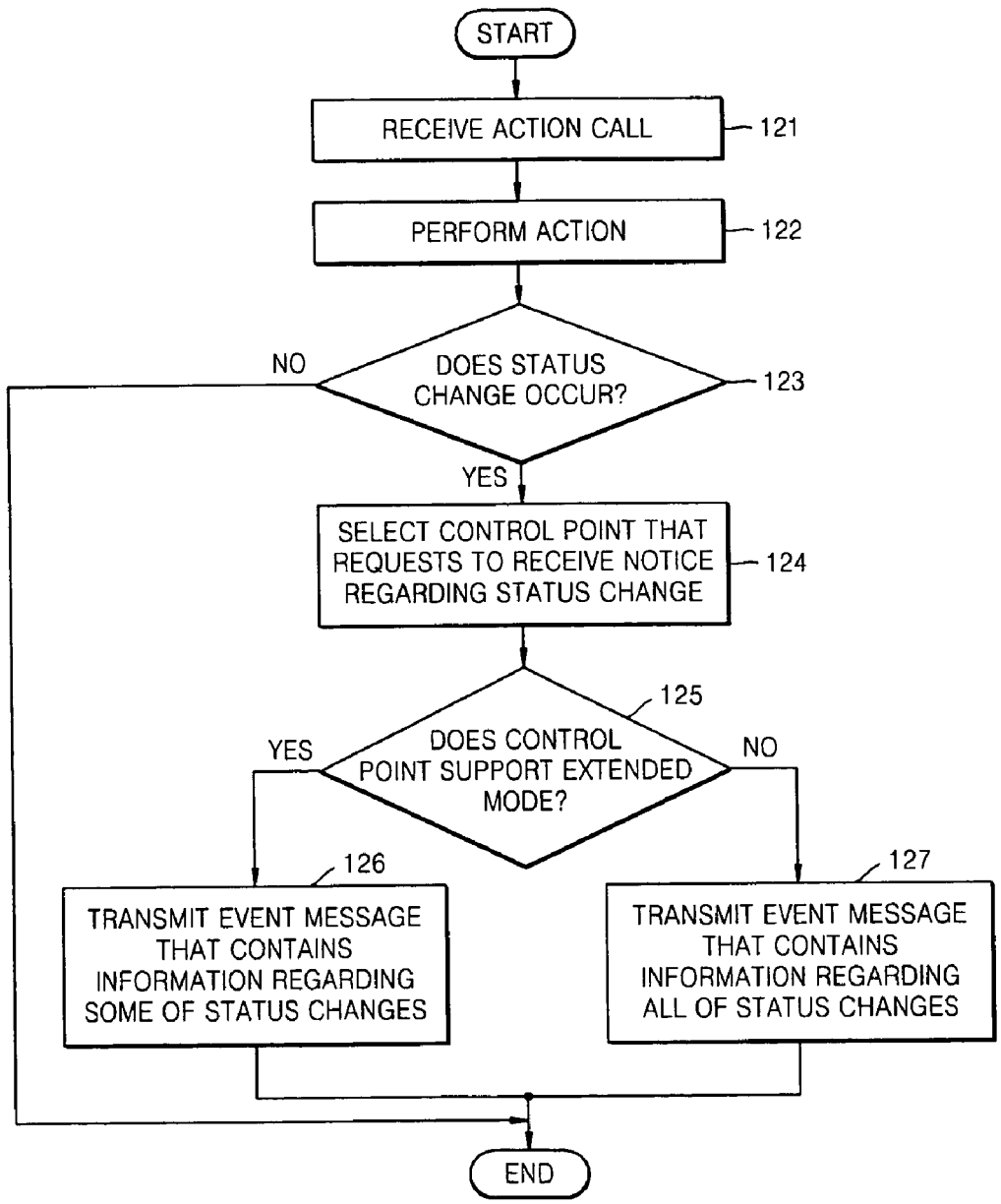

METHOD AND APPARATUS FOR TRANSMITTING AND RECEIVING INFORMATION REGARDING UPNP EVENT

CROSS-REFERENCE TO RELATED PATENT APPLICATIONS

This application claims priority from Korean Patent Application No. 10-2005-0107000, filed on Nov. 9, 2005, in the Korean Intellectual Property Office, the disclosure of which is incorporated herein in its entirety by reference.

BACKGROUND OF THE INVENTION

1. Field of the Invention

Aspects of the present invention relate to the Universal Plug and Play (UPnP) standard, and more particularly, to a method and apparatus for efficiently transmitting and receiving information regarding a UPnP event.

2. Description of the Related Art

Since a personal computer (PC) can automatically recognize peripherals using a Plug and Play function, a user can easily install peripherals. UPnP is a technique of extending the Plug and Play function all over a network and allows devices (PCs, peripherals, home appliances, etc.) to automatically recognize each other when they are connected to the network. According to the UPnP standard, network devices are largely classified into controlled devices (CD) and control points (CP). A CD, which is also referred to just as a device, provides a service, and, a CP controls the CD to use the service.

FIG. 1 is a diagram illustrating operations of UPnP networking. Referring to FIG. 1, UPnP networking includes an addressing operation 11, a discovery operation 12, a description operation 13, a control operation 14, an eventing operation 15, and a presentation operation 16.

In the addressing operation 11, the IP addresses of UPnP network devices (a device and a CP) are designated according to an automatic Internet protocol (Auto IP) method or a Dynamic Host Configuration Protocol (DHCP) client method.

In the discovery operation 12, the CP detects the device over a network according to a Simple Service Discovery Protocol (SSDP) after the IP addresses of the device and the CP are designated in addressing operation 11.

In the description operation 13, if the CP detects the device over the network in the discovery operation 12, the CP obtains a description regarding the device to determine the service that the device will provide.

In the control operation 14, if the CP obtains the description of the device in the description operation 13, the CP controls the device by calling an action according to a Simple Object Access Protocol (SOAP), based on the description of the device.

In the eventing operation 15, the device transmits an event message to indicate that at least one of the statuses of the service has changed, according to a Generic Event Notification Architecture (GENA).

In the presentation operation 16, the CP is connected to a presentation Uniform Resource Locator (URL) of the device in order to provide a user with a presentation of the device. Therefore, the user can control the device or recognize the current status of the device using the presentation URL of the device.

FIG. 2 is a diagram illustrating operations in a conventional UPnP eventing process. Referring to FIG. 2, the conventional UPnP eventing process includes the following operations.

First, in order to learn of a change in service that a device 2 provides, a CP 1 transmits to the device 2 an event subscription request message requesting a subscription to an event that indicates a change in service. Next, after receiving the event subscription request message from the CP 1, the device 2 transmits to the CP 1 an event subscription response message indicating that the CP I has subscribed to the event successfully.

Next, the device 2 transmits an initial event message that contains current values of status parameters indicating statuses of the service. Next, when an event occurs due to a status change of at least one of the services, the device 2 transmits an event message that contains the current values of the status parameters indicating the statuses of the service to the CP 1 subscribing to the event.

As described above, conventionally, if the status of at least one of the service of the device 2 changes, the device 2 transmits an event in units of service. Then, all of CPs subscribing to the event that indicates a status change of each service, receive an event message that contains information regarding the statuses of the service, i.e., the current values of all of a plurality of status parameters thereof.

That is, each control point may receive even an event message containing unnecessary status parameters. In this case, the control point filters the event message or a specific status parameter, thereby increasing network traffic and the load on the control point. In particular, this problem becomes more serious in the case of a home network with a narrow bandwidth or a control point with low hardware performance.

SUMMARY OF THE INVENTION

Aspects of the present invention provide a method and apparatus for efficiently transmitting and receiving information regarding a UPnP event in consideration of the characteristics of a UPnP device.

An aspect of the present invention also provides a computer readable medium having recorded thereon a program for executing the method in a computer.

According to an aspect of the present invention, there is provided a method of receiving event information, the method comprising requesting a notice regarding only a part of a plurality of status changes of a service for an event indicating at least one of the status changes of the service, and receiving information regarding the part of the status changes in response to the request.

According to another aspect of the present invention, there is provided an apparatus for receiving event information, the apparatus comprising a requesting unit which requests a notice regarding a part of a plurality of status changes of a service for an event informing at least one of the status changes of the service, and an eventing module which receives information regarding the part of the status changes in response to the request.

According to another aspect of the present invention, there is provided a computer readable medium in which a program for executing the method of receiving information regarding an event in a computer is stored.

According to another aspect of the present invention, there is provided a method of transmitting event information, the method comprising detecting a request for only a part of a plurality of status changes of a service as a request for an event indicating at least one of the status changes of the service, and receiving information regarding the part of the status changes in response to the request.

According to another aspect of the present invention, there is provided an apparatus for transmitting event information, the apparatus comprising a detecting unit which detects a request for only a part of a plurality of status changes of a service as a request for an event informing at least one of the status changes of the service; and an eventing module which receives information regarding the part of the status changes in response to the request.

According to another aspect of the present invention, there is provided a computer readable medium having recorded thereon a program for executing the method of transmitting information regarding an event in a computer.

BRIEF DESCRIPTION OF THE DRAWINGS

The above and other aspects and advantages of the present invention will become more apparent by describing in detail exemplary embodiments thereof with reference to the attached drawings in which:

FIG. 12 is a flowchart of a method of transmitting an event message according to an exemplary embodiment of the present invention.

DETAILED DESCRIPTION OF THE INVENTION

Hereinafter, exemplary embodiments of the present invention will be described in detail with reference to the accompanying drawings.

In most cases, Universal Plug and Play (UPnP) is applied to a home network, and therefore, there are various types of devices operating according to UPnP. Accordingly, it is efficient to receive information regarding only a part of a plurality of status changes of a service of a device operating according to UPnP, in consideration of the characteristics of the device, e.g., the characteristics of an application performed by the device, the hardware performance of the device, etc.

For instance, while a control point (CP) is performing an application that requires a part of a plurality of status parameters indicating the statuses of the service, the control point may receive from the device only current values of the required status parameters. If the hardware performance of the control point is low, the more often the control point receives event messages from the device, the greater the load on the control point. In this case, the control point may receive the current value of a service only when a status change of the service is equal to or greater than a predetermined level.

Therefore, in an exemplary embodiment of the present invention, an extended mode is introduced in which a device provides a control device with information regarding a part of status changes of a service in consideration of the characteristics of the control point, unlike the related art in which a device unilaterally transmits an event message to a control point in units of service.

Figure 1:
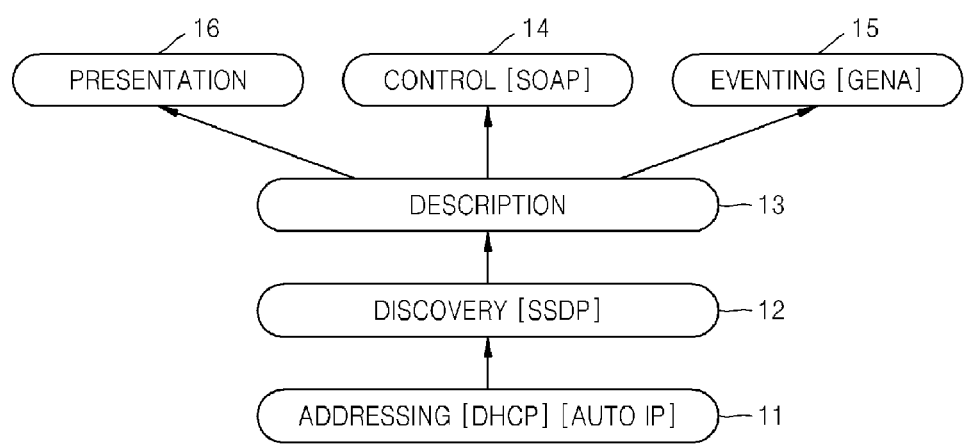
FIG. 1 is a diagram illustrating operations of UPnP networking.
Figure 2:
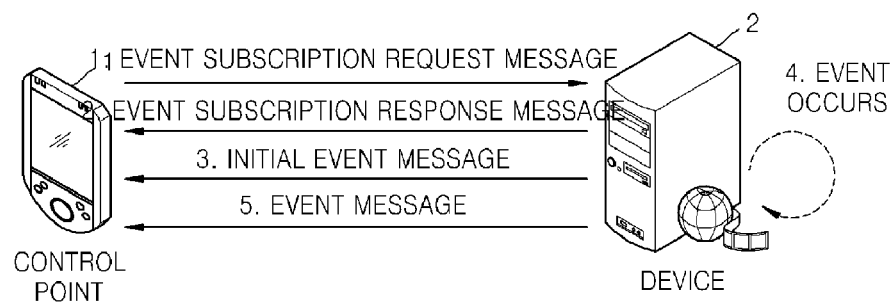
FIG. 2 is a diagram illustrating operations in a conventional UPnP eventing process.
Figure 3:
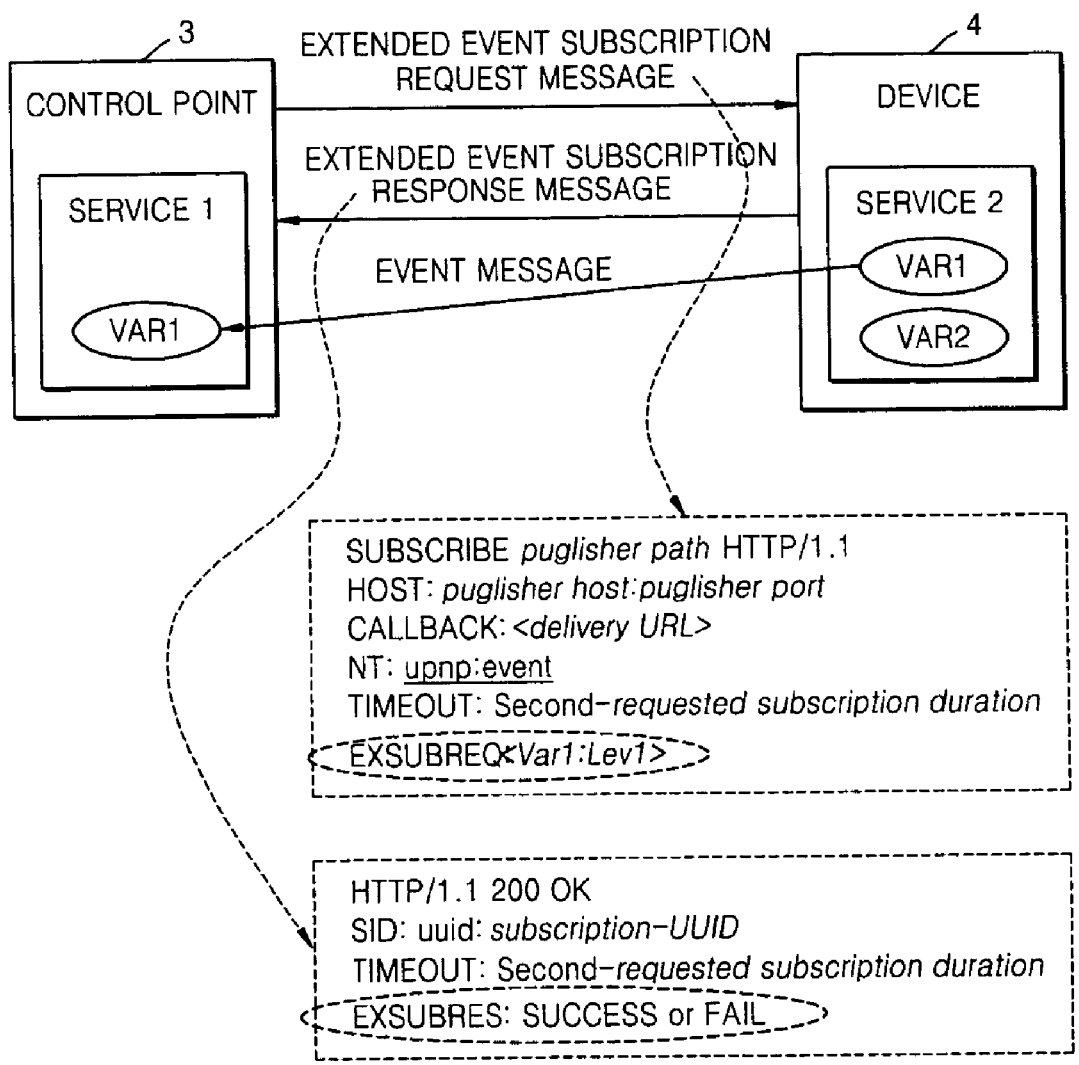
FIG. 3 is a diagram illustrating formats of an extended event subscription request message and an extended event subscription response message according to an exemplary embodiment of the present invention.

FIG. 3 is a diagram illustrating formats of an extended event subscription request message and an extended event subscription response message according to an exemplary embodiment of the present invention. Referring to FIG. 3, a control point 3 transmits an extended event subscription request message that is obtained by inserting an EXSUBREQ header, which is an extended header according to the present embodiment, into a UPnP event subscription request message. The extended header describes identification (ID) of and a predetermined level value of each of a plurality of status parameters.

The control point 3 may request a device 4 to inform it of only a part of status changes of a service of the device 4 by inserting the extended header into the UPnP event subscription request message. More specifically, the control point 3 may insert an extended header recording the IDs of the part of the status parameters into the UPnP event subscription request message so as to request the device 4 to provide the current values of the status parameters only when the values of the status parameters are changed. Also, the control point 3 may insert an extended header recording a predetermined level (value) of at least one status change into the UPnP event subscription request message so as to request the device 4 to provide the current value of at least one of a plurality of status parameters indicating the statuses of the service of the device 4 only when a change in the status parameter is equal to or greater than the predetermined level (value). Additionally, the control point 3 may insert an extended header recording the IDs and the predetermined level (value) of the part of the status parameters into the UPnP event subscription request message so as to request the device 4 to provide the current values of the status parameters indicating status changes of the service of the device 4 only when changes in the part of the status parameters are equal to or greater than the predetermined level (value).

For instance, an ID field and a level field of the extended header of the extended event subscription request message, shown in FIG. 3, record an ID Var 1 of and a predetermined level (value) Lev 1 of a status parameter, respectively. By transmitting the extended event subscription request message to the device 4, the device 4 may be requested to provide the current value of a status parameter Var 1 only when a value change in the status parameter Var 1 of status parameters indicating the statuses of the service is greater than the predetermined level (value) Lev 1. If the extended header does not include the level field recording the predetermined level (value) Lev 1, it means that the device 4 is requested to provide the current value of the status parameter Var 1 whenever the value of the status parameter Var 1 is changed.

Here, Lev 1 may denote either a change value of the status parameter Var 1 or a number of times that the value of the status parameter Var 1 is changed. For instance, if Lev 1 is 3, the current value of the status parameter Var 1 may be requested only when a change level of the status parameter Var 1 is greater than 3, or only when the number of times that the status parameter Var 1 is changed is greater than 3. Whether Lev 1 denotes a change value of the status parameter Var 1 or the number of times that the value of the status parameter Var 1 is changed, may be determined based on the characteristics of the status parameter Var 1 or a predetermined agreement between the control point 3 and the device 4.

Upon receiving the extended event subscription request message, the device 4 transmits an extended event subscription response message that is obtained by inserting an EXSUBRES header, which is an extended header according to the present exemplary embodiment, into a UPnP event subscription response message. The extended header describes a success indicating that an extended event subscription request can be processed or a failure indicating that the extended event subscription request cannot be processed. When the device 4 does not support an extended mode, the device 4 transmits an extended event subscription response message containing an extended header indicating a failure. When the device 4 supports the extended mode, the device 4 transmits an extended event subscription response message containing an extended header indicating a success. Otherwise, the extended header of the extended event subscription response message may record a success value or a failure value for each status parameter.

Next, the device 4 transmits an event message to the control point 3 subscribing to an extended event according to the present exemplary embodiment, as described above, only when the part of the statuses of the service of the device 4 changes. As a result, the control point 3 can receive the event message that contains only status parameters that the control point 3 desires. Therefore, the control point 3 does not receive an event message that contains unnecessary status parameters, thereby removing a need for a process of filtering the event message or a specific status parameter.

Figure 4:
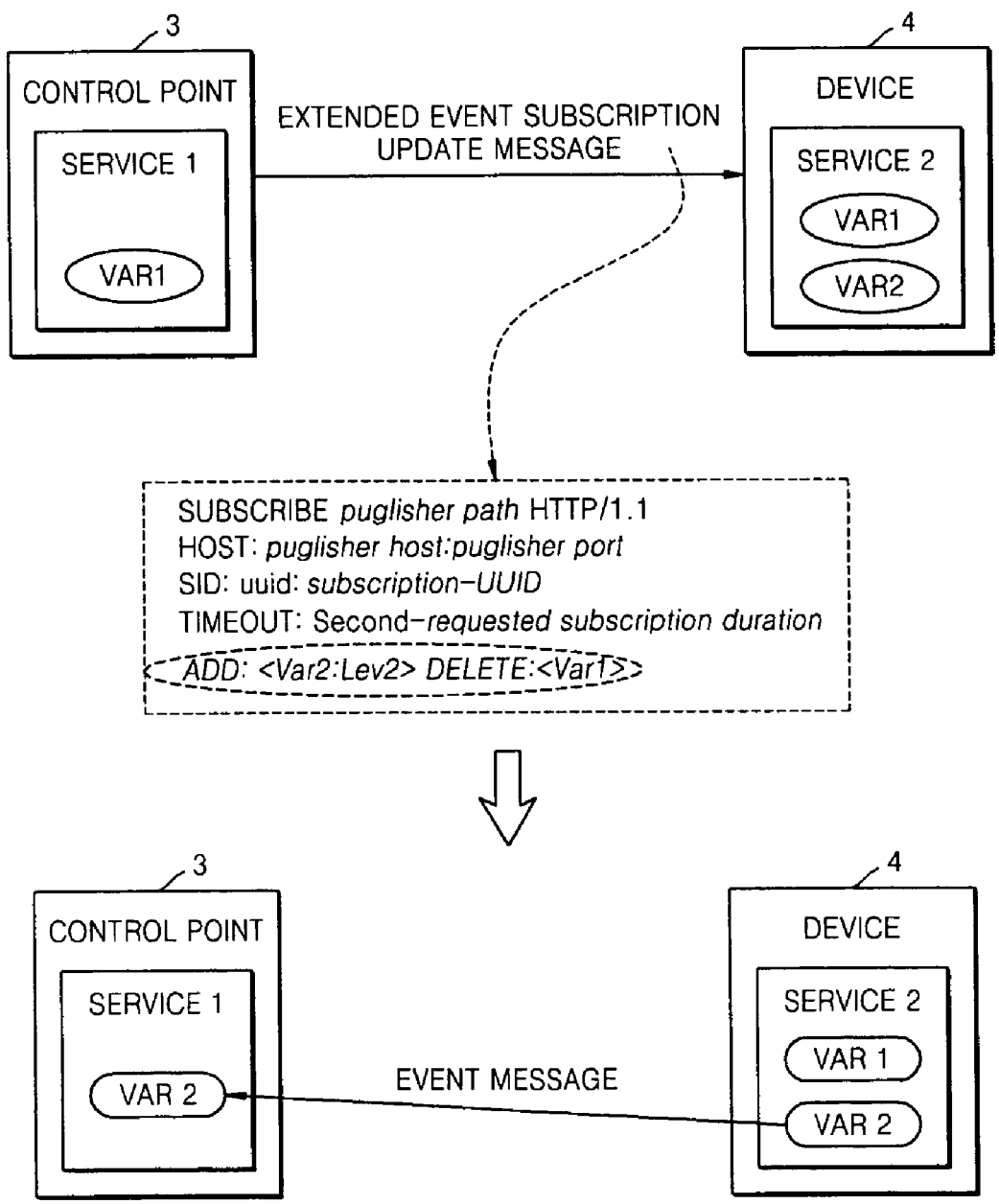
FIG. 4 a diagram illustrating a format of an extended event subscription update message according to an exemplary embodiment of the present invention.

FIG. 4 is a diagram illustrating the format of an extended event subscription update message according to an exemplary embodiment of the present invention. Referring to FIG. 4, a control point 3 transmits to a device 4 an extended event subscription request message obtained by inserting an "ADD" header and a "DELETE" header, which are extended headers according to the present exemplary embodiment, into a UPnP event subscription update message. The extended header records content that instructs a new ID to be added to or an existing ID to be deleted from the previous extended header. That is, the new ID is recorded in the "ADD" header, and the existing ID to be deleted is recorded in the "DELETE" header.

The control point 3 must periodically transmit the event subscription update message to maintain event subscription. In the present exemplary embodiment, the control point 3 may request a part of a plurality of status parameters to be updated by inserting the extended header into the UPnP event subscription update message. That is, event subscription updating is performed in units of status parameters, not units of services.

For example, referring to FIG. 4, the "ADD" header of the extended event subscription update message records ID Var 2 and a predetermined level value Lev 2 of a status parameter. Also, the "DELETE" header records ID Var 1 of the existing status parameter. Thus, when the value of the status parameter Var 1 changes, the device 4 ignores this change. Only when a change level of the value of the status parameter Var 2 is equal to or greater than Lev 2 does the device 4 transmit an event message containing the current value of the status parameter Var 2, based on the received extended event subscription update message.

Since the extended headers illustrated in FIGS. 3 and 4 are HTTP extended headers, a device operating according to conventional UPnP eventing methods ignores the extended headers when it receives the extended event subscription request message and the extended event subscription update message. Therefore, the extended event subscription request message and the extended event subscription update message are processed as a UPnP extended event subscription request message and a UPnP extended event subscription update message, respectively. In other words, the present exemplary embodiment may be used together with conventional UPnP eventing methods without compatibility problems.

Figure 5:
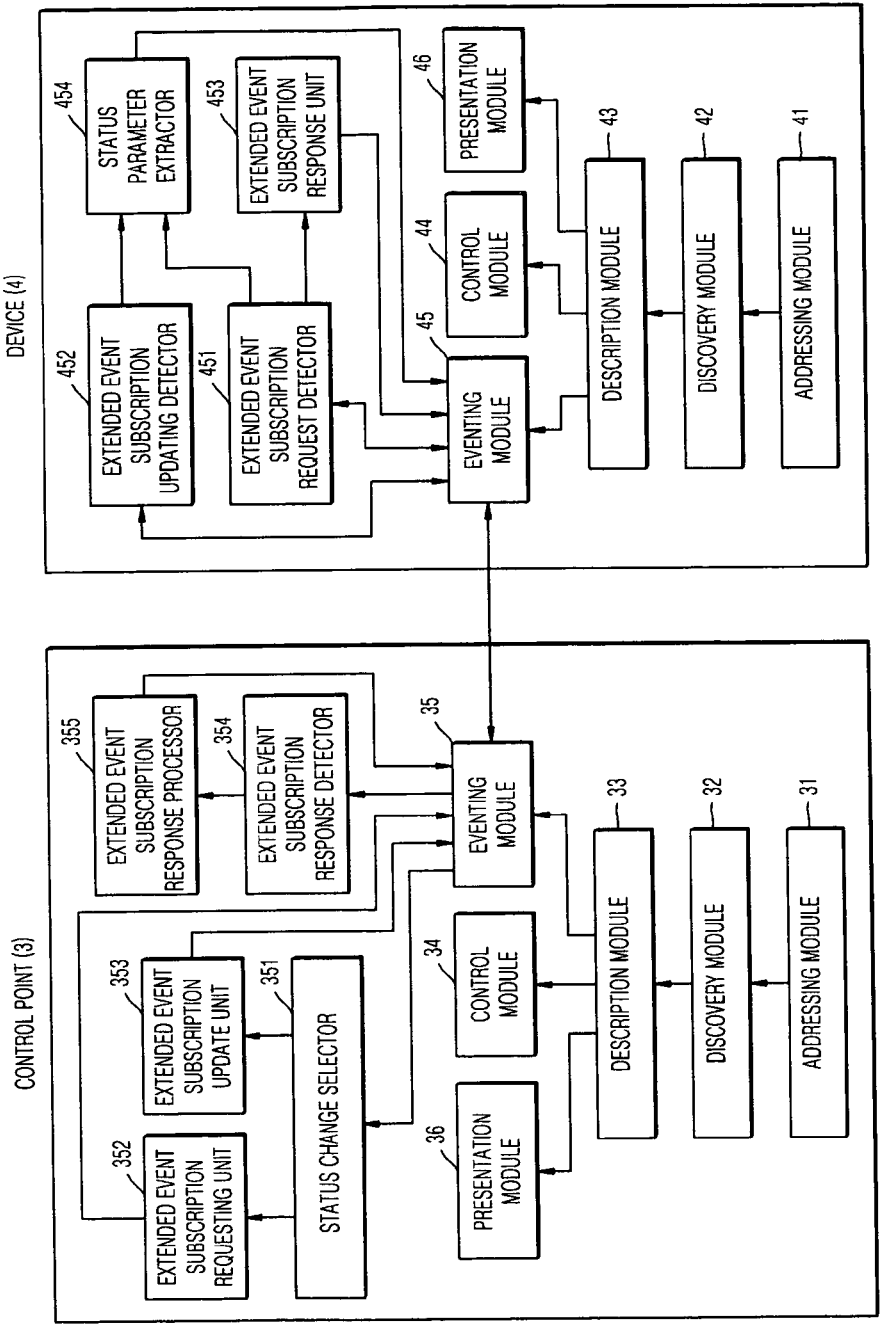
FIG. 5 is a block diagram of a control point and a device according to an exemplary embodiment of the present invention.

FIG. 5 is a block diagram of a control point 3 and a device 4 according to an exemplary embodiment of the present invention. Referring to FIG. 5, the control point 3 includes an addressing module 31, a discovery module 32, a description module 33, a control module 34, an eventing module 35, a presentation module 36, a status change selector 351, an extended event subscription requesting unit 352, an extended event subscription update unit 353, an extended event subscription response detector 354, and an extended event subscription response processor 355. The device 4 includes an addressing module 41, a discovery module 42, a description module 43, a control module 44, an eventing module 45, a presentation module 46, an extended event subscription request detector 451, an extended event subscription updating detector 452, an extended event subscription response unit 453, and a status parameter extractor 454. The addressing module 31 performs UPnP addressing. In detail, the addressing module 31 designates an Internet protocol (IP) address of the control point 3 according to an automatic (Auto) IP or a dynamic host configuration protocol (DHCP) client method. The discovery module 32, the description module 33, the control module 34, the eventing module 35, and the presentation module 36 communicate with the control point 3 by using the IP address of the control point 3, designated by the addressing module 31.

The discovery module 32 performs UPnP discovery. In detail, the discovery module 32 recognizes that the device 4 is connected to a network from an advertisement message received from the device 4 according to a Simple Service Discovery Protocol (SSDP).

The description module 33 performs UPnP description. In detail, the description module 33 obtains a description regarding the device 4 from the device 4 recognized through the UPnP discovery operation performed by the discovery module 32. The description of the device 4 includes product information of the device 4, information regarding a manufacturing company, a list of services that the device 4 provides, a presentation URL of the device 4, etc.

The control module 34 performs UPnP control. In detail, according to a Simple Object Access Protocol (SOAP), the control module 44 controls the device 4 by calling an action based on the description of the device 4, obtained through a UPnP description operation performed by the description module 43.

The eventing module 35 performs a UPnP event operation. In detail, according to a Generic Event Notification Architecture (GENA), the eventing module 35 generates and transmits a UPnP event subscription request message regarding an event that informs that at least one of status changes of the service of the device 4 occurs, based on the description of the device 4 (particularly, the list of the services) which is obtained through the UPnP description operation performed by the description module 43; and receives a UPnP event subscription response message as a response to the UPnP event subscription request message. After UPnP event subscription, the eventing module 35 receives an event message as a response to UPnP event subscription. The event message contains information regarding the statuses of the service that the device 4 provides. The eventing module 35 must transmit an event subscription update message to the device 4 to continuously receive the event message.

The presentation module 36 performs a UPnP presentation operation. Specifically, the presentation module 36 receives the description of the device 4 obtained through the UPnP description operation performed by the description module 43, and particularly, a presentation of the device 4 by accessing a presentation URL of the device 4; and provides it to a user. Then, the user can control the device 4 via the presentation URL of the device 4, or recognize the status of the device 4.

The status change selector 351 selects a part of the status changes of the service of the device 4. More specifically, the status change selector 351 selects the part of status parameters indicating the statuses of the service of the device 4, according to an instruction given by the user who recognizes the presentation of the device 4 from the presentation module 36 or a predetermined algorithm that allows the control point 3 to determine the part of the statuses of the service of the device 4.

Also, the status change selector 351 selects a predetermined level of at least one of the status changes of the service of the device 4, according to an instruction given by the user who recognizes the presentation of the device 4 received from the presentation module 36 or the predetermined algorithm that allows the control point 3 to determine the part of the statuses of the service of the device 4.

A part of the statuses of the service may be selected from a combination of the above two methods of selecting a part of the status changes of the service, as follows. That is, the status change selector 351 selects a part of status parameters indicating the statuses of the service, and the predetermined levels of the selected status parameters, according to an instruction given by the user who recognizes the presentation of the device 4 received from the presentation module 36 or the predetermined algorithm that allows the control point 3 to determine the part of the statuses of the service of the device 4.

Also, the status change selector 351 may reselect a part of the status changes of the service to update extended event subscription for the device 4.

The extended event subscription requesting unit 352 requests the device 4 to inform only a part of status changes of the service of the device 4 with respect to the event informing that at least one of the statuses of the service changes. More specifically, the extended event subscription requesting unit 352 generates an extended header recording the IDs of the status parameters selected by the status change selector 351 and inserts it into a UPnP event subscription request message, so as to request the device 4 to provide the current values of the selected status parameters only when the selected status parameters change.

Also, the extended event subscription requesting unit 352 generates an extended header recording a predetermined level (value) of at least one status change selected by the status change selector 351 and inserts it into a UPnP event subscription request message, so as to request the device 4 to provide the current value of at least one of the status parameters indicating the statuses of the service of the device 4 only when a value change of the status parameter is greater than the predetermined level (value).

Also, the extended event subscription requesting unit 352 generates an extended header recording the IDs and predetermined level (value) of a part of the status parameter, which are selected by the status change selector 351, and inserts it into a UPnP event subscription request message, so as to request the device 4 to provide the current values of the part of the status parameters indicating the statuses of the service of the device 4 only when value changes of the status parameters are greater than the predetermined level (values).

The extended event subscription update unit 353 requests updating of the part of the status parameters by generating an extended header that instructs a new ID to be added to or an existing ID to be deleted from the existing extended header, and inserting the generated extended header into a UPnP event subscription renewal message, based on the result of selection performed by the status change selector 351. Also, the extended event subscription update unit 353 requests a change of the predetermined level (value) recorded in the existing extended header by generating an extended header that instructs the predetermined level (value) to be changed and inserting it into a UPnP event subscription update message, based on the result of selection performed by the status change selector 351. Further, the extended event subscription update unit 353 may request both updating of the part of the status parameters and changing of the predetermined level, based on the result of selection performed by the status change selector 351. Here, the existing extended header indicates an extended header of an extended event subscription request message or the extended event subscription update message transmitted to the device 4.

The extended event subscription response detector 354 detects an extended event subscription response indicating whether the device 4 can process the request made by the extended event subscription requesting unit 352. More specifically, the extended event subscription response detector 354 detects the extended event subscription response by parsing the event subscription response message received by the eventing module 35 and verifying the extended event subscription response message based on the parsing result.

In particular, when detecting from the extended event subscription response message an extended header indicating that the request made by the extended event subscription requesting unit 352 cannot be processed, the extended event subscription response detector 354 determines that the device 4 does not support an extended mode in which information regarding the part of the status changes of the service according to the present exemplary embodiment is received. If detecting from the extended event subscription response message an extended header indicating that the request made by the extended event subscription requesting unit 352 can be processed, the extended event subscription response detector 354 determines that the device 4 supports the extended mode.

If the extended event subscription response detector 354 determines that the device 4 does not support the extended mode, the extended event subscription response processor 355 sets a basic mode in which information regarding all of the status changes of the service is received according to the existing UPnP standard, as an event mode of the device 4. However, if the extended event subscription response detector 354 determines that the device 4 supports the extended mode, the extended event subscription response processor 355 sets the extended mode as the event mode of the device 4.

The eventing module 35 transmits the extended event subscription request message that contains the extended header inserted by the extended event subscription requesting unit 352, and receives the extended event subscription response message as a response to the extended event subscription request message. Also, the eventing module 35 transmits the extended event subscription update message that contains the extended header inserted by the extended event subscription update unit 353, and receives a UPnP event subscription response message as a response to the extended event subscription update message.

Additionally, when the extended event subscription response processor 355 sets the basic mode as the event mode of the device 4, the eventing module 35 receives an event message containing information regarding all of the status changes of the service according to the existing UPnP standard. Also, when the extended event subscription response processor 355 sets the extended mode as the event mode of the device 4, the eventing module 35 receives an event message containing information regarding the part of the status changes of the service.

Referring to FIG. 5, the device 4 includes an addressing module 41, a discovery module 42, a description module 43, a control module 44, an eventing module 45, a presentation module 46, an extended event subscription request detector 451, an extended event subscription updating detector 452, an extended event subscription response unit 453, and a status parameter extractor 454.

The addressing module 41 performs a UPnP addressing operation. In detail, the addressing module 41 designates an IP address of the device 4 according to the auto IP or the DHCP client method. The discovery module 42, the description module 43, the control module 44, the eventing module 45, and the presentation module 46 communicate with the control point 3 by using the IP address designated by the addressing module 41.

The discovery module 42 performs UPnP discovery. Specifically, the discovery module 42 transmits an advertisement message to the control point 3 present in a network in which the device 4 is located, according to the SSDP device 4.

The description module 43 performs a UPnP description operation. Specifically, the description module 43 provides the description of the device 4 to the control point 3 that discovers the device 4 through the UPnP discovery operation performed by the discovery module 42.

The control module 44 performs UPnP control. In detail, the control module 54 receives an action call from the control point 3 that obtains the description of the device 4 through the UPnP description operation, and performs an action corresponding to the action call, according to the SOAP.

The eventing module 45 performs a UPnP eventing operation. More specifically, the eventing module 45 receives the UPnP event subscription request message from the control point 3 that receives the description of the device 4 (particularly, the list of the services of the device 4) through the UPnP description operation performed by the description module 43, and generates and transmits a UPnP event subscription response message in response to the UPnP event subscription request message, according to the GENA. After UPnP event subscription, the eventing module 45 transmits an event message specifying the statuses of the service of the device 4. A first event message of the event messages is referred to as an initial event message.

Also, the eventing module 45 transmits the event message to a control point and the control point periodically transmits the UPnP event subscription update message to the eventing module 45. That is, after receiving the UPnP event subscription update message, the eventing module 45 initializes time for event subscription updating. Also, if the time when the event subscription is updated is greater than a threshold for the time in which the eventing module 45 does not receive the UPnP event subscription update message, the eventing module 45 does not transmit the event message to a control point that must transmit the UPnP event subscription update message. Upon receiving the UPnP event subscription update message, the eventing module 45 transmits a message in response to the UPnP event subscription update message.

To continuously receive the event message, the control point 3 must periodically transmit the event subscription update message to the device 4.

In particular, according to the present exemplary embodiment, the eventing module 45 receives the extended event subscription request message from the control point 3, and the eventing module 35 receives the extended event subscription update message from the control point 3.

The presentation module 46 performs a UPnP presentation operation. In detail, the presentation module 46 transmits the description of the device 4, which was obtained through the UPnP description operation of the description module 43, and particularly transmits the presentation of the device 4 when the control point 3, which obtains the presentation URL of the device 4, is connected to the presentation URL.

The extended event subscription request detector 451 detects an extended event subscription request requesting informing of only the part of status changes of the service; that is, a request for the event that informs that at least one of the statuses of the service of the device 4 changes. In detail, the extended event subscription request detector 451 parses the event subscription request message received by the eventing module 45, and verifies the extended event subscription request message according to the parsing result, so as to detect the extended event subscription request.

In particular, the extended event subscription request detector 451 detects the IDs of the part of the status parameters, which indicate the statuses of the service of the device 4, from the extended header of the extended event subscription request message so as to detect the extended event subscription request that requests the current values of the part of the status parameters only when the values thereof charge. Also, the extended event subscription request detector 451 detects a predetermined level (value) of at least one of the status parameters from the extended header of the extended event subscription request message so as to detect the extended event subscription request that requests the current value of at least one of the status parameters only when a value change of the status parameter is equal to or greater than the predetermined level (value). Further, the extended event subscription request detector 451 detects the IDs and predetermined level (value) of the part of the status parameters from the extended header of the extended event subscription request message so as to detect the extended event subscription request that requests value changes of the part of the status parameters that are equal to or greater than the predetermined level (value).

The extended event subscription updating detector 452 parses the event subscription request message received by the eventing module 45 to verify whether it is an extended event subscription update message. If the event subscription request message is verified as an extended event subscription update message, the extended event subscription updating detector 452 detects a request for updating the part of the status parameters by checking the extended header of the extended event subscription update message to determine whether a new ID is added to or an ID is deleted from the existing extended header. Also, the extended event subscription updating detector 452 detects a request for updating a predetermined level (value) recorded in the existing extended header by checking the extended header of the extended event subscription update message to determine whether the predetermined level (value) has changed.

If a current mode is a basic mode, that is, when the device 4 does not support the extended mode in which information regarding a part of status changes of the service is transmitted, the extended event subscription response unit 453 generates an extended header indicating that a request detected by the extended event subscription request detector 451 cannot be processed, and inserts it into a UPnP event subscription response message. However, if the device 4 supports the extended mode, the extended event subscription response unit 453 generates an extended header indicating that the request detected by the extended event subscription request detector 451 can be processed, and inserts it into the UPnP event subscription response message.

The status parameter extractor 454 checks a request detected by the extended event subscription request detector 451 or the extended event subscription updating detector 452, updates information regarding the control point 3 that requests to receive a notice regarding a status change when at least one of the statuses of the service changes, and extracts information regarding the part of the status changes, which are to be transmitted to the control point 3, based on the updated information.

More specifically, the status parameter extractor 454 extracts the current value of a status parameter corresponding to the ID detected by the extended event subscription request detector 451. The status parameter extractor 454 extracts the current value of a status parameter, a value change of which is equal to or greater than the predetermined level (value) detected by the extended event subscription request detector 451. Also, the status parameter extractor 454 extracts the current value of a status parameter that is included in the status parameters whose IDs are detected by the extended event subscription request detector 451, and a value change of which is equal to or greater than the predetermined level (value) detected by the extended event subscription request detector 451.

The status parameter extractor 454 updates the part of the status parameters in response to the request for updating the part of the status parameters, detected by the extended event subscription updating detector 452, and extracts the current values of the updated status parameters. Also, the status parameter extractor 454 updates the predetermined level (value) in response to the request for updating the predetermined level (value), detected by the extended event subscription updating detector 452, and extracts the current value of a status parameter whose value change is equal to or greater than the updated, predetermined level (value).

Figure 6:
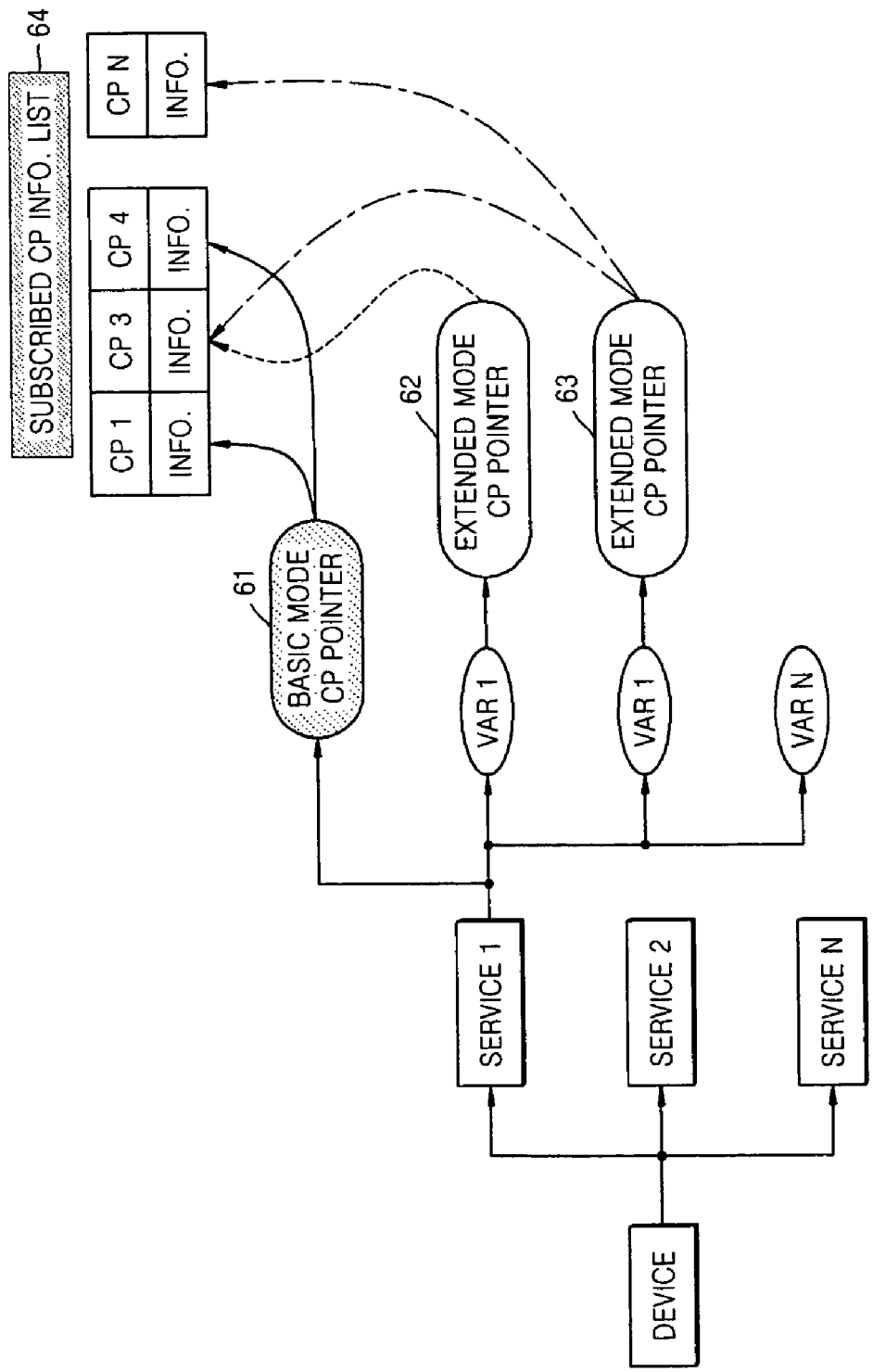
FIG. 6 is a diagram illustrating a detailed construction of a status extracting unit of the device of FIG. 5 according to an exemplary embodiment of the present invention.

FIG. 6 is a diagram illustrating the detailed structure of the status parameter extractor 454 of the device of FIG. 5 according to an exemplary embodiment of the present invention. Referring to FIG. 6, the status parameter extractor 454 includes a basic mode control point (CP) pointer 61, extended mode CP pointers 62 and 63, and a subscribed CP information list 64.

The basic mode CP pointer 61 and the extended mode CP pointers 62 and 63 are based on a hierarchical structure comprised of a device, N services, and N status parameters. The device at the uppermost level is linked to the N services at another level. The N services are respectively linked to the N status parameters at the lowermost level.

The subscribed CP information list 64 is a list of information regarding control points subscribing to an event that informs that at least one of the statuses of a service changes. Here, the information regarding the control points includes the IDs of the control points and predetermined level (values) of status parameters designated by the control points. The basic mode CP pointer 61 and the extended mode CP pointers 62 and 63 point to the information regarding the control points included in the subscribed CP information list 64.

The basic mode CP pointer 61 is constructed in units of services. The basic mode CP pointer 61 points to the information regarding control points that subscribe to the event that informs that at least one of statuses of a service linked thereto changes, but do not support the extended mode. In contrast, the first and second extended mode CP pointers 62 and 63 are constructed in units of status parameters. The extended mode CP pointers 62 and 63 point to the information regarding control points subscribing to both the event that informs that at least one of statuses of a service linked thereto and an extended event that informs the current values of linked status parameters only when the values of the linked status parameters change.

The status parameter extractor 454 adds pointer links to the basic mode CP pointer 61 based on the event subscription request message received by the eventing module 45 of FIG. 5. Also, the status parameter extractor 454 adds pointer links to the extended mode CP pointers 62 and 63 based on the request detected by the extended event subscription request detector 451 of FIG. 5. Further, the status parameter extractor 454 adds pointer links to or deletes pointer links from the extended mode CP pointers 62 and 63 based on the request detected by the extended event subscription updating detector 452.

Also, the status parameter extractor 454 determines control points that request a notice regarding a status change when at least one of the statuses of the service changes, based on the pointer links to the updated basic mode CP pointer 61 or the extended mode CP pointers 62 and 63. That is, the control point whose ID is included in the information regarding the control points, indicated by the basic mode CP pointer 61, is a control point that requests all of a plurality of status parameters of service linked to the basic mode CP pointer 61. However, the control point whose ID is included in the information regarding the control points, indicated by the extended mode CP pointers 62 and 63, is a control point that requests only status parameters linked to the extended mode CP pointers 62 and 63.

The status parameter extractor 454 extracts the current values of all of a plurality of status parameters representing the statuses of service linked to the basic CP pointer 61 to transmit them to the control points indicated by the basic mode CP pointer 61. Also, the status parameter extractor 454 extracts the current values of the status parameters linked to the extended mode CP pointers 62 and 63 to transmit them to the control points indicated by the extended mode CP pointers 62 and 63. In particular, if the information regarding the control points, indicated by the extended mode CP pointers 62 and 63, includes predetermined level (values) of status parameters, the status parameter extractor 454 extracts the current values of the status parameters linked to the extended mode CP pointers 62 and 63 only when changes of the values of the linked status parameters are equal to or greater than the predetermined level (value).

As described above, the status parameter extractor 454 may be constructed by using only several pointers and changing the locations of the pointers depending on whether the device supports the basic mode or the extended mode. Therefore, the system structure of a device according to an exemplary embodiment of the present invention is more practical than those of conventional UPnP devices. Further, the amount of additional resources requested by the device of the exemplary embodiments is less than that requested by the conventional UPnP devices.

In particular, in the present exemplary embodiment, the eventing module 45 transmits an event message containing the information regarding all of the status changes of the service according to the existing UPnP standard when an event mode of the device 4 is set to the basic mode, and not the extended mode in which information regarding a part of the status changes of the service is transmitted. Also, if the device 4 supports the extended mode, the eventing module 45 transmits an event message containing information regarding the part of the status changes of the service, extracted by the status parameter extractor 454, in response to a request detected by the extended event subscription request detector 451 or the extended event subscription updating detector 452.

More specifically, the eventing module 45 receives the extended event subscription request message, and then transmits an extended event subscription response message containing the extended header inserted by the extended event subscription response unit 453, in response to the extended event subscription request message. Additionally, when the values of the part of the status parameters indicating the statuses of the service change, the eventing module 45 transmits an event message containing the current values of the changed status parameters. Additionally, when a value change of at least one of the status parameters indicating the statuses of the service is equal to or greater than the predetermined level (value), the eventing module 45 transmits an event message containing the current value of the at least one status parameter. Also, when the values of the part of the status parameters indicating the statuses of the service change and a value change of at least one of the changed status parameters is equal to or greater than the predetermined level (value), the eventing module 45 transmits an event message containing the current values of the changed status parameters.

Further, upon receiving the extended event subscription update message, when the part of the status parameters are updated, the eventing module 45 transmits an event message containing the current values of the updated status parameters in response to the extended event subscription update message. Also, the eventing module 45 transmits an event message containing the current values of status parameters, value changes of which are equal to or greater than the updated, predetermined level (value).

Figure 7:
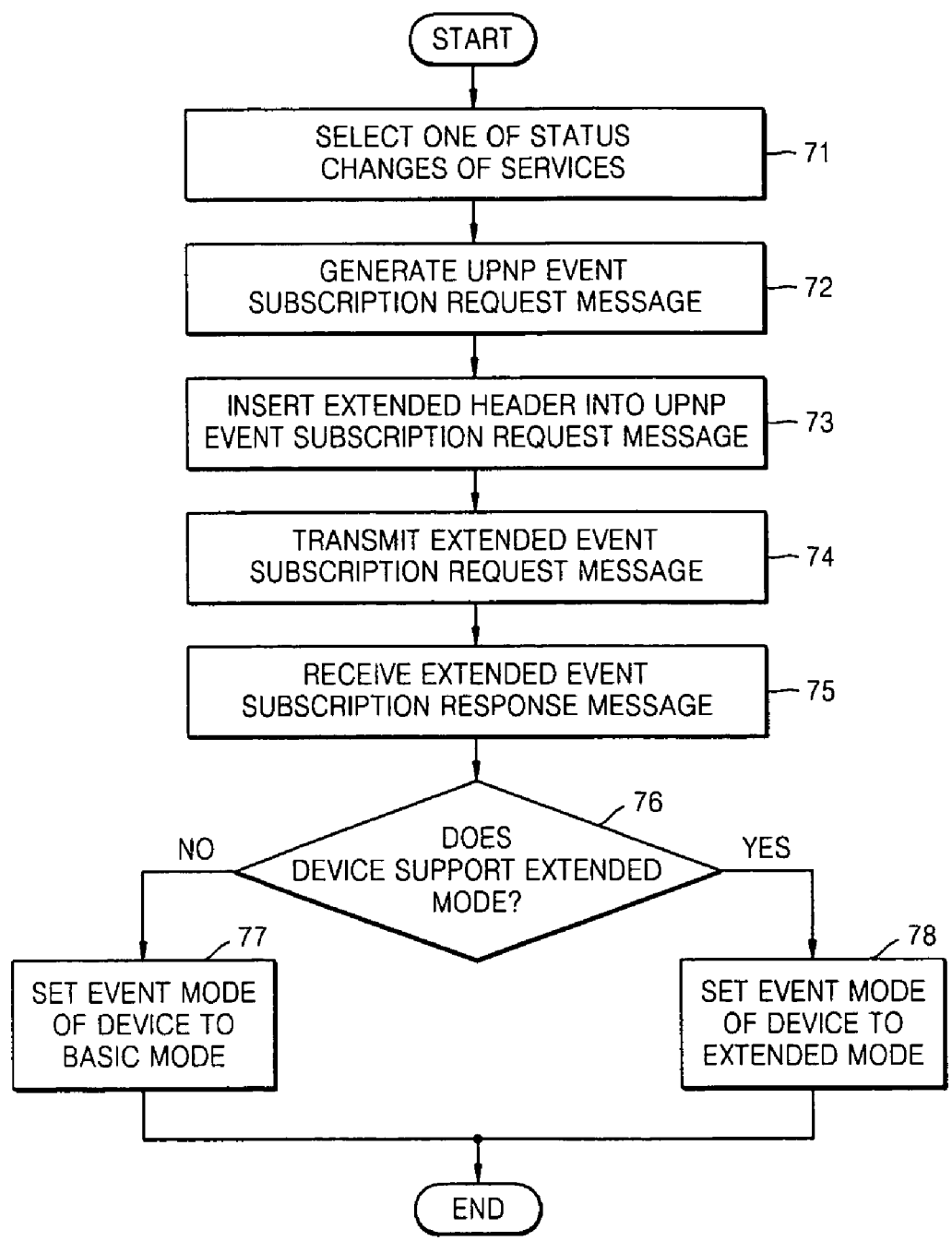
FIG. 7 is a flowchart of an extended event subscription request method according to an exemplary embodiment of the present invention.

FIG. 7 is a flowchart of an extended event subscription request method according to an exemplary embodiment of the present invention. The method illustrated in FIG. 7 is comprised of operations performed by the control point 3 of FIG. 3 according to time. Therefore, although not described here, the descriptions regarding the control point 3 with reference to FIG. 5 are also applied to the method of FIG. 7.

Referring to FIG. 7, in operation 71, the control point 3 selects the part of the status changes of the service that the device 4 provides. In detail, in operation 71, the control point 3 selects the part of a plurality of status parameters indicating the statuses of the service of the device 4, or a predetermined level (value) of at least one of the status changes. Alternatively, in operation 71, the control point 3 may select the part of the status parameters indicating the statuses of the service and determine a predetermined level (value) of the selected status parameters.

In operation 72, the control point 3 generates a UPnP event subscription request message.

In operation 73, the control point 3 generates an extended header according to an exemplary embodiment of the present invention and inserts it into the UPnP event subscription request message generated in operation 72 so as to request a notice regarding a change in only the status parameters selected in operation 71.

More specifically, in operation 73, the control point 3 generates an extended header recording the IDs of the status parameters selected in operation 71 and inserts it into the UPnP event subscription request message so as to request a notice regarding a change in only the selected status parameters. Also, in operation 73 operation, the control point 3 generates an extended header recording a predetermined level (value) of at least one of the status changes selected in operation 71 and inserts it into the UPnP event subscription request message so as to request the current value of at least one of the status parameters indicating the statuses of the service of the device 4 only when a value change of the at least one status parameter is equal to or greater than the predetermined level (value). In operation 73, the control point 3 generates an extended header recording the IDs and predetermined level (value) of the status parameters selected in operation 71, and inserts it into the UPnP event subscription request message, so as to request the current values of the part of the status parameters indicating the statuses of the service of the device 4 only when value changes of the status parameters are equal to or greater than the predetermined level (value).

In operation 74, the control point 3 transmits an extended event subscription request message containing the extended header inserted in operation 73.

In operation 75, the control point 3 receives an extended event subscription response message in response to the extended event subscription request message transmitted in operation 74.

In operation 76, the control point 3 detects from the extended event subscription response message received in operation 75 the extended header indicating that a request specified in the extended event subscription request message transmitted in operation 74 cannot be processed, determines that device 4 does not support the extended mode, and proceeds to operation 77. Also, in operation 76, the control point 3 detects from the extended event subscription response message received in operation 75 the extended header indicating that the request specified in the extended event subscription request message transmitted in operation 74 can be processed, determines that the device 4 supports the extended mode, and proceeds to operation 78.

In operation 77, the control point 3 sets the basic mode in which information regarding all of the status changes of the service is received according to the existing UPnP standard, as an event mode of the device 4.

In operation 78, the control point 3 sets the extended mode, according to the present exemplary embodiment, in which information regarding the part of the status changes of the service is received, as the event mode of the device 4.

Figure 8:
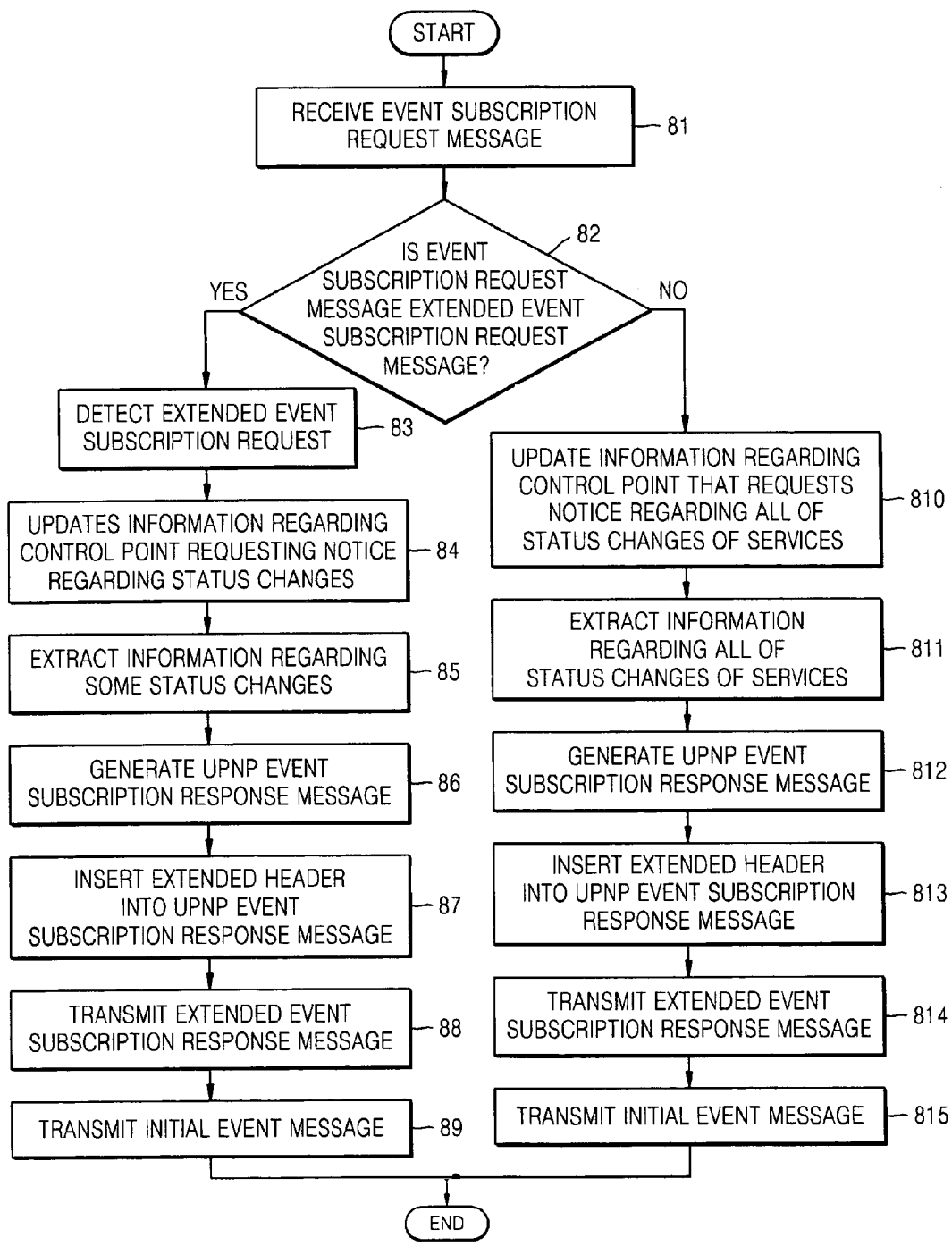
FIG. 8 is a flowchart of a method of processing an extended event subscription request according to an exemplary embodiment of the present invention.

FIG. 8 is a flowchart of a method of processing an extended event subscription request according to an exemplary embodiment of the present invention. The method of FIG. 8 is comprised of operations performed by the device 4 of FIG. 5 according to time. Thus, although not described here, the description regarding the device 4 with respect to FIG. 4 is also applied to the method of FIG. 8.

Referring to FIG. 8, in operation 81, the device 4 receives an event subscription request message.

In operation 82, the device 4 parses the event subscription request message received in operation 81, and proceeds to operation 83 when the parsing result reveals that the received message is an extended event subscription request message or proceeds to operation 810 when the parsing result reveals that the received message is a UPnP event subscription request message.

In operation 83, the device 4 detects an extended event subscription request requesting to be informed about a part of the status changes of the service of the device 4, from the extended header of the extended event subscription request message verified in operation 82.

In detail, in operation 83, the device 4 detects the IDs of the part of the status parameters from the extended header of the extended event subscription request message received in operation 82 so as to detect an extended event subscription request requesting the current values of the part of the status parameters only when the values of the part of the status parameters indicating the statuses of the service of the device 4 change. Also, in operation 83, the device 4 detects a predetermined level (value) of at least one of the status changes from the extended header of the extended event subscription request message received in operation 82 so as to detect an extended event subscription request requesting the current value of at least one of status parameters indicating the statuses of the service of the device 4 only when a value change of the status parameter is equal to or greater than the predetermined level (value). Further, in operation 83, the device 4 detects the IDs and predetermined level (value) of the part of the status parameters from the extended header of the extended event subscription request message received in operation 82 so as to detect an extended event subscription request requesting the current values of the part of the status parameters indicating the statuses of the service of the device 4 only when value changes of the part of the status parameters are equal to or greater than the predetermined level (value).

In operation 84, the device 4 updates information regarding a control point requesting a notice regarding a status change when at least one of the statuses of the service changes, based on the extended event subscription request detected in operation 83.

In operation 85, the device 4 extracts information regarding the part of the status changes to be transmitted to the control point, based on the information updated in operation 84. In detail, in operation 85, the device 4 extracts the current values of status parameters corresponding to the IDs detected in operation 83. Also, in operation 85, the device 4 extracts the current value of a status parameter, where a value change of which is equal to or greater than the predetermined level (value) detected in operation 83. Additionally, in operation 85, the device 4 extracts the current value of a status parameter, of status parameters corresponding to the IDs detected in operation 83, where a value change of which is equal to or greater than the predetermined level (value) detected in operation 83.

In operation 86, the device 4 generates a UPnP event subscription response message.

In operation 87, the device 4 generates an extended header recording a success indicating that it supports the extended mode in which information regarding the part of the status changes of the service is transmitted, and inserts it into the UPnP event subscription response message generated in operation 86.

In operation 88, the device 4 transmits an extended event subscription response message that contains the extended header inserted into the UPnP event subscription response message in operation 87.

In operation 89, the device 4 transmits an initial event message that contains the information regarding the part of the status changes of the service, extracted in operation 85, to a control point that requests a notice regarding the part of the status changes of the service.

In operation 810, the device 4 updates information regarding a control point that requests a notice regarding all of the status changes of the service, that is, a control point that supports the basic mode, based on the extended event subscription request detected in operation 83.

In operation 811, the device 4 extracts information regarding all of the status changes of the service, which is to be transmitted to the control point, based on the information updated in operation 810.

In operation 812, the device 4 generates a UPnP event subscription response message.

In operation 813, the device 4 generates an extended header recording a failure indicating that it does not support the extended mode in which information regarding the part of the status changes of the service is transmitted, and inserts it into the UPnP event subscription response message generated in operation 812.

In operation 814, the device 4 transmits an extended event subscription response message that contains the extended header inserted in operation 813.

In operation 815, the device 4 transmits an initial event message that contains the information regarding all of the status changes, extracted in operation 811, to the control point that supports the basic mode.

Figure 9:
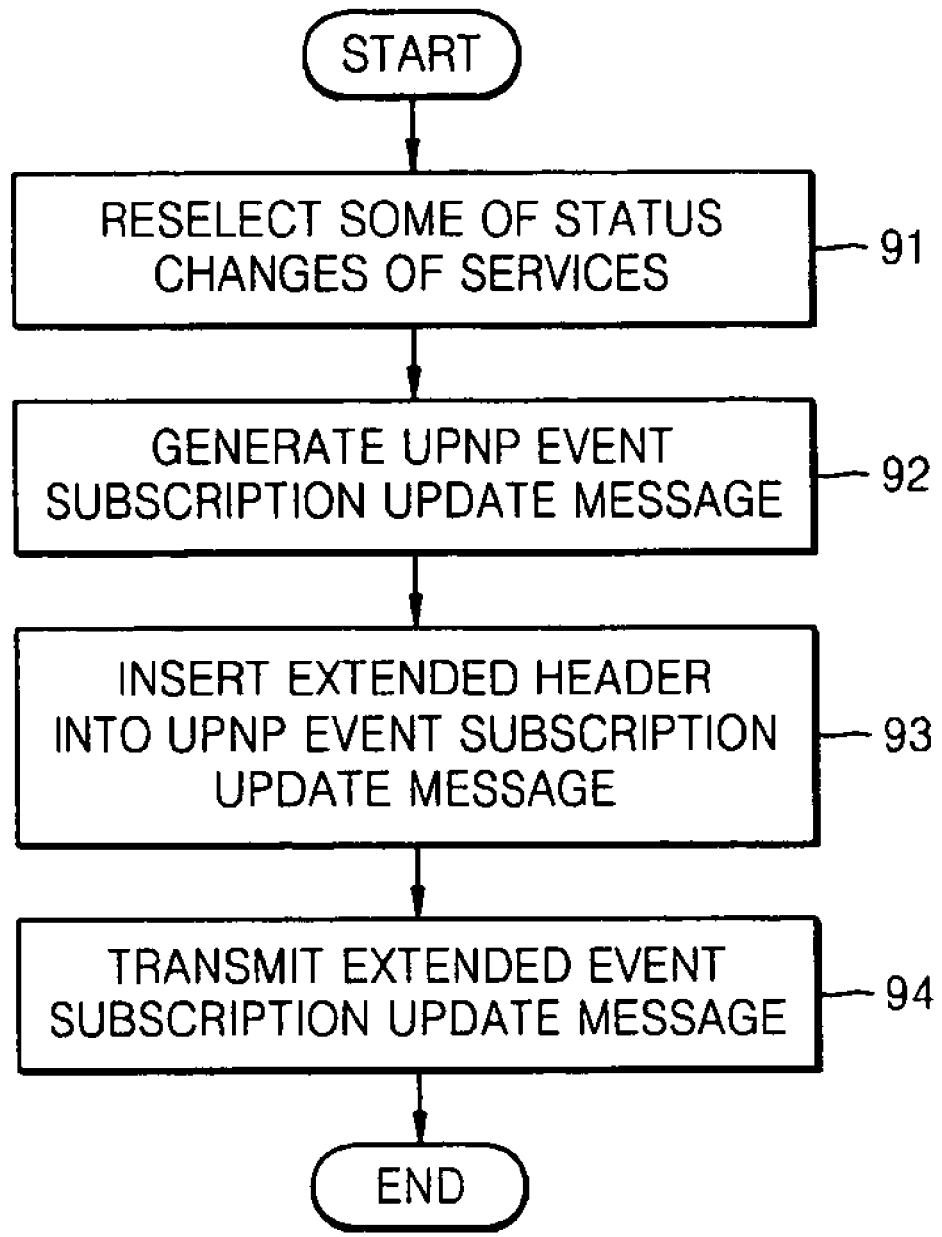
FIG. 9 is a flowchart of an extended event subscription update method, performed by a control point, according to an exemplary embodiment of the present invention.

FIG. 9 is a flowchart of an extended event subscription update method, performed by the control point 3 of FIG. 5, according to an exemplary embodiment of the present invention. The method of FIG. 9 is comprised of operations performed by the control point 3 according to time. Therefore, although not described here, the description regarding the control point 3 with reference to FIG. 5 is also applied to the method of FIG. 9.

Referring to FIG. 9, in operation 91, the control point 3 reselects a part of status changes of a service of the device 4 so as to update an extended event subscription related to the device 4.

In operation 92, the control point 3 generates a UPnP event subscription update message.

In operation 93, the control point 3 generates an extended header that instructs a new ID, which is not recorded in the existing extended header, to be added or an ID which is recorded in the existing extended header to be deleted, based on the reselection result obtained in operation 91; and inserts it into the UPnP event subscription update message generated in operation 92, thereby requesting an update of the part of the status parameters. Also, in operation 93, the control point 3 generates an extended header that instructs a predetermined level (value) recorded in the existing extended header to be changed, based on the reselection result obtained in operation 91; and inserts it into the UPnP event subscription update message generated in operation 92, thereby requesting the predetermined level (value) to be changed. Additionally, in operation 93, the control point 3 may request both updating of the part of the status parameters and changing of the predetermined level (value), based on the reselection result obtained in operation 91.

In operation 94, the control point 3 transmits an extended event subscription update message that contains the extended header inserted in operation 93.

Figure 10:
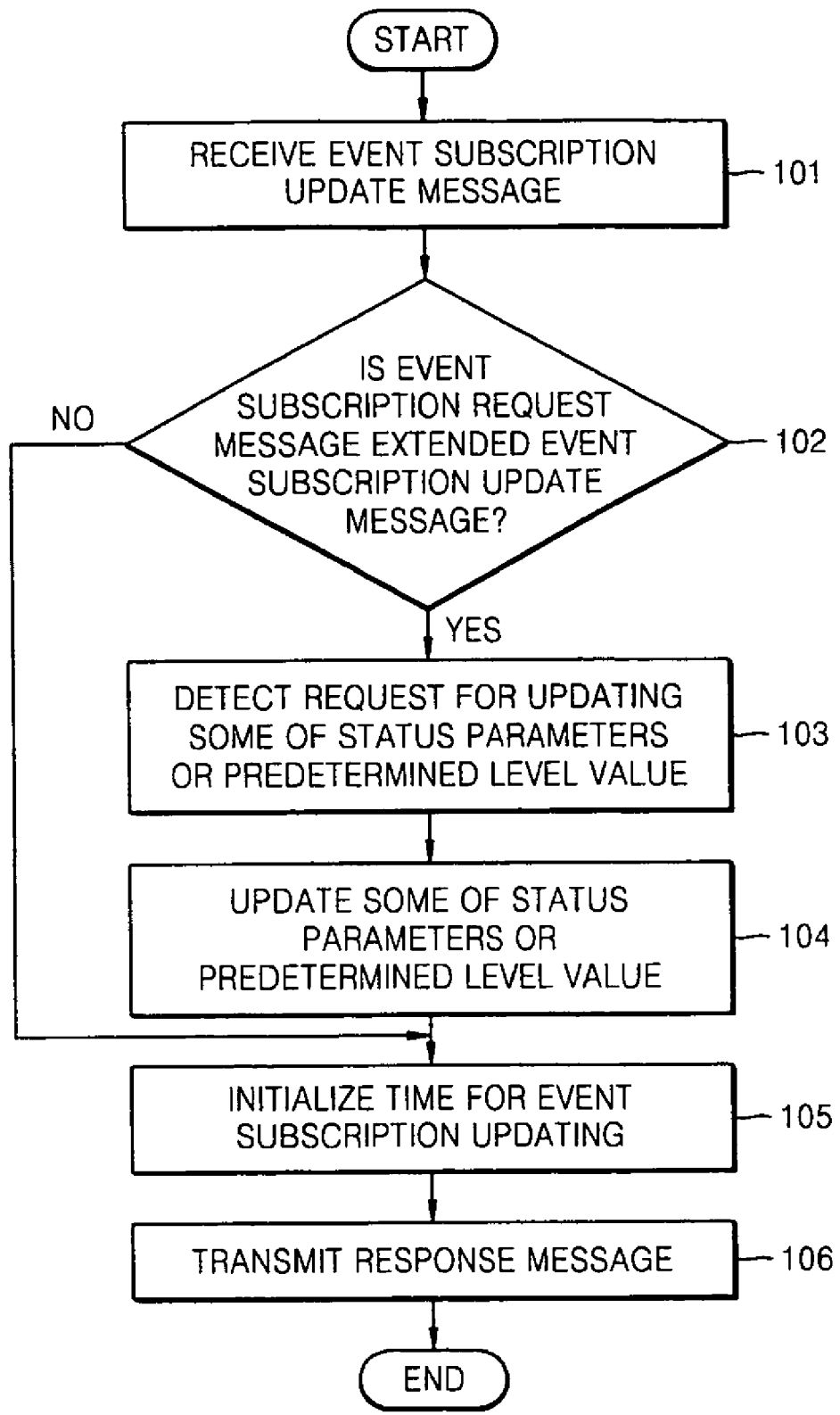
FIG. 10 is a flowchart of an extended event subscription update method, performed by a device, according to an exemplary embodiment of the present invention.

FIG. 10 is a flowchart of an extended event subscription update method, performed by the device 4 of FIG. 5, according to an exemplary embodiment of the present invention. The method of FIG. 10 is comprised of operations performed by the device 4 of FIG. 5 according to time, and thus, although not described here, the above description regarding the device 4 with reference to FIG. 5 is also applied to the method of FIG. 10.

In operation 101, the device 4 receives an event subscription update message.

In operation 102, the device 4 parses the event subscription request message received in operation 101, and proceeds to operation 103 when the received message is an extended event subscription update message or proceeds to operation 105 when the received message is a UPnP event subscription update message.

In operation 103, the device 4 detects a request for updating the part of the status parameters by checking the extended header of the extended event subscription update message parsed in operation 102 to determine whether a new ID is added to or an ID is deleted from the existing extended header. Also, in operation 103, the device 4 detects a request for updating the predetermined level (value) recorded in the existing extended header by checking the extended header of the extended event subscription update message parsed in operation 102 to determine whether the predetermined level (value) is changed.

In operation 104, the device 4 updates the part of the status parameters in response to the request for updating the part of the status parameters, detected in operation 103. Also, in operation 104, the device 4 updates the predetermined level (value) in response to the request for updating the predetermined level (value), detected in operation 103.

In operation 105, if the updating in operation 104 is completed, the device 4 initializes a time when event subscription has been updated.

In operation 106, after initializing the time in operation 105, the device 4 transmits a message in response to the UPnP event subscription update message.

Figure 11:
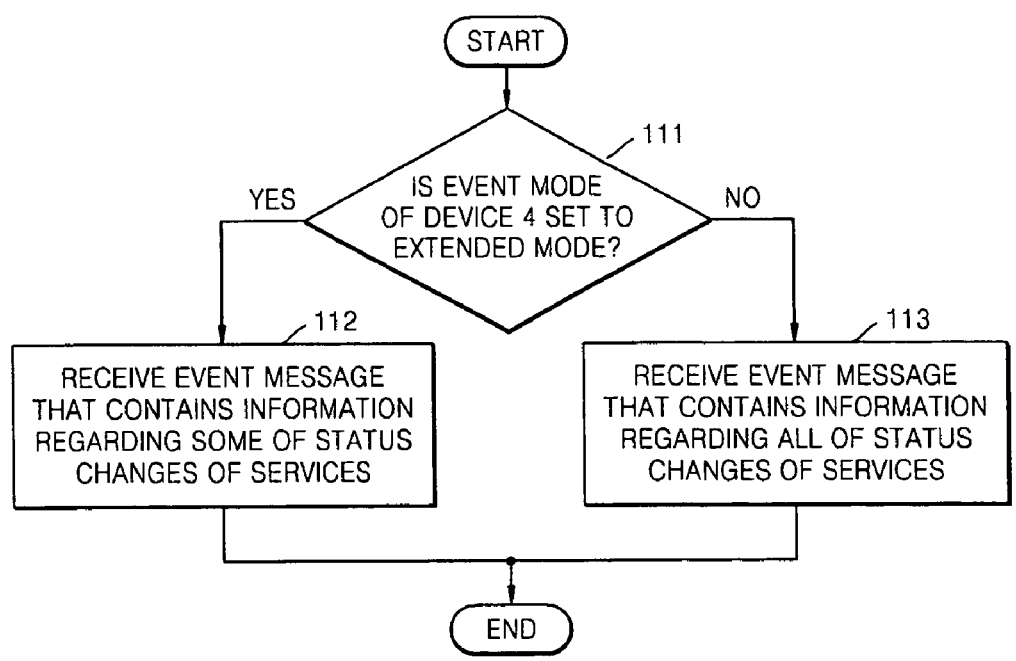
FIG. 11 is a flowchart of a method of receiving an event message according to an exemplary embodiment of the present invention.

FIG. 11 is a flowchart of a method of receiving an event message according to an exemplary embodiment of the present invention. The method of FIG. 11 is comprised of operations performed by the control point 3 of FIG. 5 according to time, and thus, although not described here, the description regarding the control point 3 with reference to FIG. 5 is also applied to the method of FIG. 10.

Referring to FIG. 11, in operation 111, the control point 3 determines whether an event mode of device 4 is set to the extended mode or the basic mode, and if it is determined that the event mode is set to the extended mode, the method proceeds to operation 112 and if it is determined that the event mode is set to the basic mode, the method proceeds to operation 113.

In operation 112, the control point 3 receives an event message that contains information regarding the part of the status changes of the service that the device 4 provides.

In operation 113, the control point 3 receives an event message that contains information regarding all of the status changes of the service that the device 4 provides.

FIG. 12 is a flowchart of a method of transmitting an event message according to an exemplary embodiment of the present invention. The method of FIG. 12 is comprised of operations performed by the device 4 of FIG. 5 according to time, and thus, although not described here, the above description regarding the device 4 with respect to FIG. 5 is also applied to the method of FIG. 12.

Referring to FIG. 12, in operation 121, the device 4 receives an action call.

In operation 122, the device 4 performs an action corresponding to the action call received in operation 121.

In operation 123, the device 4 proceeds to operation 124 when at least one of the statuses of the service of the device 4 changes, caused by performing the action in operation 122, and if a status change does not occur, the device 4 completes the method otherwise.

In operation 124, the device 4 selects a control point that requests to receive a notice regarding such a status change.

In operation 125, the device 4 proceeds to operation 126 when the control point selected in operation 124 supports the extended mode, and proceeds to operation 127 when the selected control point supports the basic mode.

In operation 126, the device 4 transmits an event message that contains information regarding a part of the status changes of the service.

In operation 127, the device 4 transmits an event message that contains information regarding all of the status changes of the service.

The above exemplary embodiments of the present invention may be tangibly embodied as computer readable programs and performed in a general digital computer by executing the programs, using a computer readable medium. Also, the data constructions used in the above exemplary embodiments may be recorded on a computer readable medium via various devices.

Examples of the computer readable medium include a magnetic recording medium (a ROM, a floppy disk, a hard disc, etc.), and an optical recording medium (a CD-ROM, a DVD, etc.).

Aspects of the present invention introduce an extended mode in which an event message that contains information regarding only a part of status changes of a service that a UPnP device provides is transmitted, thereby allowing a control point to receive event messages, each containing only necessary status parameters. Therefore, unlike the related art, it is possible to prevent the control point from receiving an event message that contains unnecessary status parameters, thereby removing a need to filter the event message or specific status parameters.

In particular, conventionally, if the control point has low hardware performance, it is highly probable that the control point receives an event message that contains unnecessary status parameters of the service of the device, thereby increasing the load on the control point. In contrast, according to an exemplary embodiment of the present invention, it is possible to adjust the number of event messages to be received, according to the hardware performance of the control point. There is a case where only a part of the status parameters are needed according to the characteristics of an application that is being performed by the control point, or a part of the status parameters are changed very often. In this case, according to an exemplary embodiment of the present invention, it is possible to more efficiently receive information regarding only a part of the status changes of the service in consideration of the characteristics of the application.

Also, aspects of the present invention introduce an extended event subscription update message that requests updating of a part of the status parameters of the service of the UPnP device, thereby allowing a control point subscribing to an event to dynamically add or delete status parameters. Also, since an extended event subscription request message and an extended event subscription update message according to exemplary embodiments of the present invention are formed by using a HTTP extended header, they can be applied even to conventional UPnP eventing methods without compatibility problems. Accordingly, according to an exemplary embodiment of the present invention, it is possible to reduce a total number of event messages to be transmitted via a home network, thereby saving home network bandwidth.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of receiving event information in a Universal Plug and Play (UPnP) network, the method comprising:
(a) selecting by a control point, a part of a plurality of status parameters of a service for an event based on characteristics of an application performed by the control point and selecting by the control point, a predetermined level of the selected part of the plurality of status parameters based on a hardware performance of the control point, the service being provided to the control point by a controlled device, and the plurality of status parameters of the service indicating statuses of the service provided to the control point by the controlled device;
(b) transmitting, by the control point to the controlled device, under a control of a processor of the control point, an event subscription request message including information of the selected part and the selected predetermined level to request a notice regarding the part of the plurality of status parameters of the service for the event which indicates at least one of status changes of the service to be provided by the controlled device only when a change in a value of the part of the status parameters of the service is equal to or greater than the predetermined level; and
(c) receiving by the control point, information regarding only the selected part of the status parameters in response to the request.

2. The method of claim 1, wherein the event is an event that informs at least one of the status changes of the service that a Universal Plug and Play (UPnP) device provides.

3. The method of claim 1, wherein during (b), only when there is the change in the value of the part of the status parameters indicating the statuses of the service, a current value of the part of the changed status parameters is requested.

4. The method of claim 3, wherein during (b), the current value of the part of the status parameters is requested by inserting an extended header recording identification of the part of the status parameters into a message requesting a subscription to the event.

5. The method of claim 4, further comprising updating the part of the status parameters by inserting an extended header, which instructs a new identification to be added or an identification of a status parameter to be deleted from the existing extended header, into a message requesting updating of the subscription to the event.

6. The method of claim 1, wherein during (b), a current value of at least one of the status parameters indicating the statuses of the service is requested only when a value change of the at least one status parameter is equal to or greater than the predetermined level.

7. The method of claim 6, wherein during (b), the current value of the at least one status parameter is requested by inserting an extended header recording the predetermined level into the message requesting a subscription to the event.

8. The method of claim 7, further comprising requesting change of the predetermined level by inserting an extended header, which instructs the predetermined level to be changed, into the message requesting update of the subscription to the event.

9. A control point for receiving event information in a Universal Plug and Play (UPnP) network, the control point comprising:
a selector which selects a part of a plurality of status parameters of a service for an event based on characteristics of an application performed by the control point and selects a predetermined level of the selected part of the plurality of status parameters based on a hardware performance of the control point, the service being provided to the control point by a controlled device, and the plurality of status parameters indicating statuses of the service provided to the control point by the controlled device;
a requesting unit which generates a header having information of the selected part and the selected predetermined level and inserts the header into an event subscription request message to request a notice regarding the part of the plurality of status parameters of the service for the event which indicates at least one of status changes of the service to be provided by the controlled device only when a change in a value of the part of the status parameters of the service is equal to or greater than the predetermined level; and
an eventing module which transmits the event subscription request message and receives information regarding only the selected part of the status parameters in response to the event subscription request message.

10. A non-transitory computer readable medium having embodied thereon a program for executing a method of receiving event information in a Universal Plug and Play (UPnP) network in a computer, the method comprising:
selecting by a control point, a part of a plurality of status parameters of a service for an event based on characteristics of an application performed by the control point and selecting by the control point, a predetermined level of the selected part of the plurality of status parameters based on a hardware performance of the control point, the service being provided to the control point by a controlled device, and the plurality of status parameters of the service indicates statuses of the service provided to the control point by the controlled device;
transmitting, by the control point to the controlled device, an event subscription request message including information of the selected part and the selected predetermined level to request a notice regarding the part of the plurality of status parameters of the service for the event which indicates at least one of status changes of the service to be provided by the controlled device only when a change in a value of the part of the status parameters of the service is equal to or greater than the predetermined level; and
receiving by the control point, information regarding only the selected part of the status parameters in response to the request.

11. A method of transmitting event information in a Universal Plug and Play (UPnP) network, the method comprising:
(a) detecting by a controlled device, under a control of a processor of the controlled device, an event subscription request message including information of a part of a plurality of status parameters of a service and a predetermined level of the part of the plurality of status parameters, as a request for an event which indicates at least one of status changes of the service to be provided by the controlled device only when a change in a value of the part of the status parameters of the service is equal to or greater than the predetermined level, the service being provided to the control point by the controlled device, and the plurality of status parameters indicating statuses of the service provided to the control point by the controlled device; and (b) transmitting by the controlled device, information regarding only the part of the status parameters in response to the request when the change in the value of the part of the status parameters is equal to or greater than the predetermined level, wherein the part of the plurality of status parameters is selected based on characteristics of an application performed by the control point and the predetermined level is selected based on a hardware performance of the control point.

12. The method of claim 11, wherein the event is an event that indicates at least one of the status changes of a service that a Universal Plug and Play (UPnP) device provides.

13. The method of claim 11, wherein during (a), only when there is the change in the value of the part of the plurality of status parameters indicating the statuses of the service, a request for a current value of the part of the status parameters is detected, and during (b), when the change in the value of the part of the status parameters is equal to or greater than the predetermined level, an event message containing the current value of the part of the status parameters is transmitted.

14. The method of claim 13, wherein during (a), the request is detected by detecting identification of the part of the status parameters from a message requesting a subscription to the event.

15. The method of claim 14, further comprising detecting a request for updating the status parameter by determining whether a new identification is added or the identification of a status parameter is deleted.

16. The method of claim 11, wherein during (a), only when a value change of at least one of status parameters indicating the statuses of the service is equal to or greater than the predetermined level, a request for requesting a current value of the status parameter is detected, and during (b), when the value change of the status parameter is equal to or greater than the predetermined level, an event message containing a current value of the status parameter is transmitted.

17. The method of claim 16, wherein during (a), the request is detected by detecting the predetermined level from the message requesting the subscription to the event.

18. The method of claim 17, further comprising detecting a request for updating the predetermined level by determining whether the predetermined level value is changed.

19. A device for transmitting event information in a Universal Plug and Play (UPnP) network, the device being a controlled device, the device comprising:

a detecting unit which detects an event subscription request message including information of a for a part of a plurality of status parameters of a service and a predetermined level of the part of the plurality of status parameters, as a request for an event which indicates at least one of status changes of the service to be provided by the controlled device only when a change in a value of the part of the status parameters of the service is equal to or greater than the predetermined level, the service being provided to the control point by the controlled device, and the plurality of status parameters indicating statuses of the service provided to the control point by the controlled device; and an eventing module which transmits information regarding only the part of the status parameters in response to the request when the change in the value of the part of the status parameters is equal to or greater than the predetermined level, wherein the part of the plurality of status parameters is selected based on characteristics of an application performed by the control point and the predetermined level is selected based on a hardware performance of the control point.

20. A non-transitory computer readable medium having embodied thereon a program for executing a method of transmitting event information in a Universal Plug and Play (UPnP) network, the method comprising:

detecting by a controlled device, an event subscription request message including information of a part of a plurality of status parameters of a service and a predetermined level of the part of the plurality of status parameters, as a request for an event which indicates at least one of status changes of the service to be provided by the controlled device only when a change in a value of the part of the status parameters of the service is equal to or greater than the predetermined level, the service being provided to the control point by the controlled device, and the plurality of status parameters indicating statuses of the service provided to the control point by the controlled device; and transmitting information regarding only the part of the status parameters in response to the request when the change in the value of the part of the status parameters is equal to or greater than the predetermined level, wherein the part of the plurality of status parameters is selected based on characteristics of an application performed by the control point and the predetermined level is selected based on a hardware performance of the control point.

* * * * *